(12) United States Patent
Krenn et al.

(10) Patent No.: US 11,128,445 B2
(45) Date of Patent: Sep. 21, 2021

(54) METHOD FOR CREATING AND DISTRIBUTING CRYPTOGRAPHIC KEYS

(71) Applicant: AIT AUSTRIAN INSTITUTE OF TECHNOLOGY GMBH, Vienna (AT)

(72) Inventors: Stephan Krenn, Moedling (AT); Thomas Loruesner, Vienna (AT); Bernhard Schrenk, Ulrichskirchen (AT); Christoph Pacher, Vienna (AT)

(73) Assignee: AIT Austrian Institute of Technology GmbH, Vienna (AT)

( * ) Notice: Subject to any disclaimer, the term of this patent is extended or adjusted under 35 U.S.C. 154(b) by 21 days.

(21) Appl. No.: 16/603,325

(22) PCT Filed: Mar. 13, 2018

(86) PCT No.: PCT/AT2018/060063
§ 371 (c)(1),
(2) Date: Oct. 7, 2019

(87) PCT Pub. No.: WO2018/184054
PCT Pub. Date: Oct. 11, 2018

(65) Prior Publication Data
US 2020/0052891 A1 Feb. 13, 2020

(30) Foreign Application Priority Data

Apr. 5, 2017 (AT) .............................. A 50280/2017

(51) Int. Cl.
*H04L 9/08* (2006.01)
*G06F 7/72* (2006.01)
(Continued)

(52) U.S. Cl.
CPC ............ *H04L 9/0819* (2013.01); *G06F 7/724* (2013.01); *G06F 11/1004* (2013.01);
(Continued)

(58) Field of Classification Search
CPC ... H04L 9/00; H04L 9/08; H04L 29/06; H04L 63/0435; H04L 9/0855; H04L 9/0852;
(Continued)

(56) References Cited

U.S. PATENT DOCUMENTS 7,577,617 B1 * 8/2009 Reisinger ........... G07B 17/0008
101/71
7,760,885 B2 * 7/2010 Park ...................... H04L 9/3013
380/283

(Continued)

OTHER PUBLICATIONS

David J.C. MacKay, "Information Theory, Inference, and Learning Algorithms", LDPC codes in Chapter 47, Cambridge University Press 2003, Version 7.2 (fourth printing) Mar. 28, 2005.
(Continued)

*Primary Examiner* — Thanhnga B Truong
(74) *Attorney, Agent, or Firm* — Laurence A. Greenberg; Werner H. Sterner; Ralph E. Locher

(57) ABSTRACT

A method creates and distributes cryptographic keys for securing communication at two terminals. Signals for creating correlated values in the two terminals are distributed via a first communication channel burdened with error, and the correlated values are present as keys. A checksum is formed on the basis of the first key present in the first terminal and the checksum is transferred to the second terminal via a second communication channel. A second checksum is formed on the basis of the second key present, and information derived from the two checksums is transferred via the second communication channel to a server. Based on the information derived from the checksums, the server determines a correction value, which, when applied to one or both keys, brings the keys into correspondence. The correction value is transferred to one or both terminals via the second communication channel and is applied to one or both keys.

12 Claims, 1 Drawing Sheet

(51) Int. Cl.
 *G06F 11/10* (2006.01)
 *G06F 17/16* (2006.01)
 *H04L 29/06* (2006.01)

(52) U.S. Cl.
 CPC ............ *G06F 17/16* (2013.01); *H04L 9/0852* (2013.01); *H04L 63/0435* (2013.01)

(58) Field of Classification Search
 CPC .......... H04L 9/0819; H04N 7/18; H04N 9/73; G06F 17/00; G06F 11/10; G06F 17/16; G06F 7/72; G06F 7/724; G06F 11/1004
 See application file for complete search history.

(56) References Cited

U.S. PATENT DOCUMENTS

| | | | | |
|---|---|---|---|---|
| 8,013,906 | B2* | 9/2011 | Ikeda | H04N 5/23219 348/223.1 |
| 8,964,987 | B2* | 2/2015 | Sowa | H04W 12/04 380/278 |
| 9,294,272 | B2 | 3/2016 | Luetkenhaus et al. | |
| 2006/0171541 | A1* | 8/2006 | Horn | H04W 12/041 380/278 |
| 2011/0018998 | A1* | 1/2011 | Guzik | H04N 7/18 348/143 |
| 2015/0036824 | A1 | 2/2015 | Dixon et al. | |

OTHER PUBLICATIONS

Robert G. Gallager, "Low-Density Parity-Check Codes" (PDF), Monograph, M.I.T. Press 1963, retrieved Aug. 7, 2013.
Todd K. Moon, "Error Correction Coding—Mathematical Methods and Algorithms", Wiley-Interscience, Hoboken, NJ, 2005, ISBN 0-471-64800-0—Book abstract.

* cited by examiner

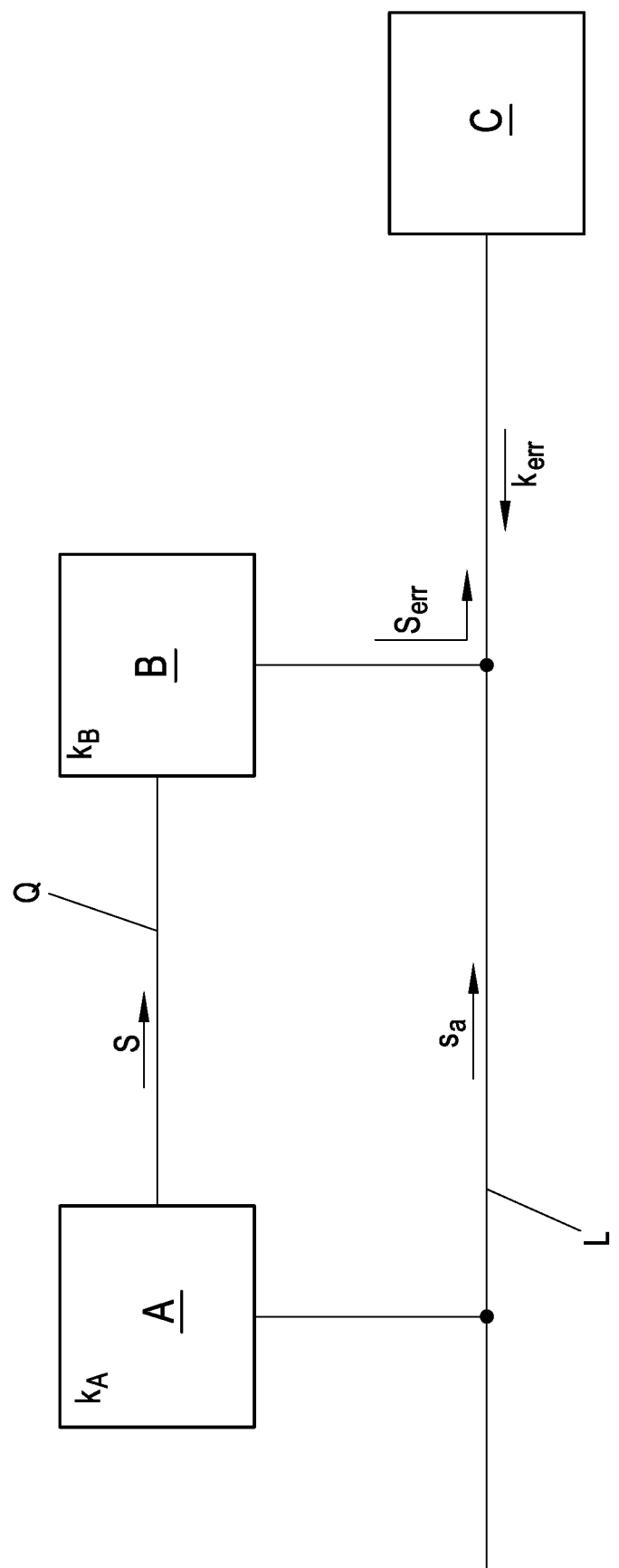

METHOD FOR CREATING AND DISTRIBUTING CRYPTOGRAPHIC KEYS

BACKGROUND OF THE INVENTION

Field of the Invention

The invention relates to an error correction method for creating and distributing a key for two terminals for use as cryptographic keys as part of a symmetric cryptography procedure.

From the prior art it is known to generate a cryptographic key between two terminal devices using quantum communication. The transfer of the key via a quantum communication channel or other highly error-prone channel has the effect that different keys are contained in the two respective terminals. From the prior art it is also known to correct one of the two or both keys, in such a way that the two keys are identical and these two keys can then be used within a symmetric cryptography procedure in the communication between the two terminals. To perform this correction, a checksum based on one key and a publicly known test matrix is typically generated in one of the two terminals, and this is transmitted to the other terminal. Methods are known with which the key of the second terminal is modified in such a way that the checksum matches the checksum that is derived as the product of the test matrix and the first key. Such procedures are known, for example, from Todd K. Moon: Error Correction Coding. Mathematical Methods and Algorithms. Wiley-Interscience, Hoboken N.J., 2005. ISBN 0-471-64800-0.

A major disadvantage of this approach is that the correction of the key is extremely computationally intensive, and after the initial transfer of the key gives rise to a high resource loading of the terminal that corrects the key.

However, measures for external calculation of data also known from the prior art, such as the execution of the algorithm required to correct the key in a data center, have the major problem that the necessarily secret key leaves the terminal and must be transferred to a data center which is not necessarily reliable.

SUMMARY OF THE INVENTION

The object of the invention is to create a key correction method that can be executed on a computer which has greater computing capacity and which needs to meet lower requirements with respect to data privacy.

The invention achieves this object with the features of the independent claim.

In accordance with the invention it is provided that
a) signals for creating correlated values in the two terminals are distributed via a first error-prone communication channel, in particular via a quantum communication channel, and said correlated values are present as keys in the two terminals in such a manner,
b) a checksum is formed on the basis of the first key present in the first terminal and said checksum is transferred to the second terminal via a second communication channel different from the first communication channel,
c) a second checksum is formed based on the second key present in the second terminal and the two checksums or the difference of the two checksums or information derived therefrom about the second communication channel is transmitted to a server which is different from the two terminals and physically separated therefrom,
d) on the basis of the two checksums or the difference of the two checksums or the information derived therefrom, the server determines a correction value, which when applied to one or both of the keys brings the keys into correspondence, and
e) that the correction value is transmitted to one or both terminals via the second communication channel and applied to one or both of the keys.

A key advantage of the method according to the invention lies in the fact that the server used for generating the correction value can remain open to any other persons and no specific security clearance is required for the server.

Furthermore, the communication channel used for communications between the server and the terminals does not need to be secured against eavesdropping.

A particularly simple initial distribution of keys to the two terminals provides that the signals for generating correlated values are distributed in the two terminals by
- a random signal being created by the first terminal and, in particular by means of quantum communication, being transmitted to the second terminal, or
- a random signal being created by the second terminal and, in particular by means of quantum communication, being transmitted to the first terminal, or
- an entangled quantum state being generated by an external signal source and transmitted to both terminals by means of quantum communication.

A further improvement in security can be achieved by parts of the transmitted signal being selected and the remaining parts of the transmitted signal being discarded in order to form the correlated values.

A particularly efficient approach, which allows a simple correction of the keys based on a linear procedure, provides
- that a key is specified as a binary vector of a given length,
- that a publicly known test matrix comprising binary numbers as entries is defined, the number of rows of which corresponds to the length of the keys and the number of columns corresponds to the length of the checksums and
- the checksums are formed by generating a matrix-vector multiplication, in which the XOR operation is used as addition of bits and the AND operation is used as multiplication of bits.

It can also be provided for this purpose,
- that a key is specified as a vector of a given length, the elements of which originate from a Galois field,
- that a publicly known test matrix is defined, comprising elements of a Galois field as entries, the number of rows of which corresponds to the length of the keys and the number of columns to the length of the checksums, and
- that the checksums are formed by generating a matrix-vector multiplication, wherein the relevant operations of the element from a Galois field are used as addition and multiplication.

In order to increase the transmission security, in particular in order to exclude the possibility that attackers might gain enough information about the key by some kind of monitoring during the key exchange or the key comparison, it can be provided that the length of the keys is reduced in a pre-specified way by a number of bits which is at least equal to the number of bits of the checksum.

After the exchange of the keys a secure data transmission is possible, wherein between the two terminals messages are exchanged which have been protected by means of a symmetric cryptography procedure, in each case using the key stored in the terminals.

After the exchange of the keys it is possible to test the authenticity of transmitted messages by messages being exchanged between the terminals, wherein a hash value is appended to each of the messages, the hash value being derived in a predefined way from the key and from the information to be transmitted in the message,
wherein upon reception the receiving terminal checks whether the hash value transmitted is derived in the predefined way from the key and from the information to be transmitted in the message, and in this case the authenticity of the message is verified.

A preferred embodiment of the invention is described in more detail by reference to the following drawings.

BRIEF DESCRIPTION OF THE DRAWING

The single FIGURE of the drawing is an illustration of a communications system having two terminals in which cryptographic keys are created and distributed according to the invention.

DESCRIPTION OF THE INVENTION

In the FIGURE of the drawing the terminals A, B of two communication subscribers are shown, which are connected to each other via a potentially insecure second communication channel L and via a first communication channel Q, in particular via a quantum communication channel. In the present exemplary embodiment of the invention, the terminal A has a transmitting device, with which signals can be transmitted to the terminal B via the first communication channel Q. The terminal B has a receiving device, with which outbound signals from the terminal A can be received via the first communication channel Q.

For the signals to be transferred via the first communication channel Q, quantum signals are typically used. These are signals represented only by a very small number of photons. In the process of quantum communication it is thus possible to detect attackers, since in the event of individual signals being read via the first communication channel Q perturbations are caused on the channel, so that the signal either does not arrive at the receiving terminal B at all, or only with errors. However, other signals can also be alternatively transmitted over a communications channel Q, for which the attacker is also not able to copy the complete signal.

As the signal, a random data signal is advantageously transmitted from the first terminal A via the first communication channel Q. This data signal is additionally stored as a key $k_A$. The second terminal B stores the data signal received via the first communication channel Q as key $k_B$.

In addition, in the distribution of the key it can be provided that the signal-generating terminal A emits the individual photons generating the signal with a constantly changing polarization. In this case, the terminal B can also adjust its receiver to a different polarization, wherein the polarization of the emitted photons is not matched to the polarization of the receiving device in the second terminal B. Only after the transmission of the signal in an alignment step will the two terminals A, B match the signal components with one another, in which the polarization of the photons emitted by the first terminal A corresponds to the polarization of the receiver unit of the second terminal B. The other signal components, in which the polarization of the signal component emitted by terminal A does not correspond to the polarization of the receiving device of the second terminal B, are discarded. If two polarization directions are defined in both terminals A, B, the information content of the signal available for generating the key is reduced by half.

In order to perform an alignment, after the transmission of the key the two terminals exchange the polarization direction used with each other so that for the respective signal component or key present on them, they can determine which of the bits were sent with matched transmitting and receiving devices. The remaining bits of the respective key are discarded. The polarizations are only exchanged after the signal from the first terminal A has been transferred to the second terminal B via the first communication channel Q. Of particular advantage here is that the exchange of the polarization directions used for the sending and receiving does not give an attacker any information whatsoever about the exchanged key.

After this initial step of the key matching, a key $k_A$, $k_B$ now exists in each of the two terminals A, B. As a result of non-ideal transmission characteristics of the channel and the possible influence of attackers, the keys $k_A$, $k_B$ are not identical.

In a first step, one of the two terminals, in the present case the first terminal A, now creates a checksum $s_A$ based on the key $k_A$ present on it. This checksum can be formed in different ways, wherein in this exemplary embodiment a variant is chosen which leads to a particularly simple numerical treatment. In this case, the key $k_A$ is treated as a bit vector comprising a plurality of individual bits. In addition, a publicly known test matrix P of a specified size is agreed between the two terminals A, B, which can also be known to any attackers.

The test matrix P used in forming the checksum has a number of rows which corresponds to the number of the elements in the row vector of the key $k_a$. The test matrix P has a number of columns which corresponds to the number of desired entries in the column vector of the checksum $s_A$. The specific formation of test matrices is conveniently presented in more detail in Information Theory, Inference, and Learning algorithms, by David J. C. MacKay, discusses LDPC codes in Chapter 47.

For generating a checksum vector $s_A$, a matrix-vector multiplication is performed between the test matrix P and the key vector $k_A$, represented here as a row vector, whereupon a row checksum vector $s_A$ is obtained. In the present exemplary embodiment, to simplify the presentation a binary vector is used for the key $k_A$, a test matrix P filled with binary numbers and a column vector filled with binary numbers as the checksum $s_A$. If as part of the matrix-vector multiplication a multiplication between individual binary numbers is required, then the AND operation is used for this. If in the matrix-vector multiplication an addition is required, the individual values to be summed are subjected to an XOR operation. A structure provided with the AND and XOR operations as multiplication and addition with the values 0 and 1 forms a field and is also referred to in mathematics as a Galois field GF2.

Instead of the Galois field GF2 used here, other linear structures, in particular other Galois fields, can also be used as elements of the key, the checksums or the test matrix. These structures have, as does GF2, the properties of a field, in particular also offering the possibility of addition and multiplication.

As the result of this matrix-vector multiplication, a checksum $s_A$ is obtained, which in turn is treated in the following as a row vector.

The first terminal A transmits the first checksum $s_A$ thus transmitted via the additional communication channel L to the second terminal B. The second terminal B in turn then forms a checksum $s_B$, based on the key $k_B$ present on it, in the same way as the first terminal A. The second terminal B then forms the difference $s_{err}$ as the difference between the two checksums $s_A$ and $s_B$.

$$S_{err} = S_A - S_B = (k_A - k_B) \cdot P = k_{err} \cdot P$$

Instead of the formation of the direct difference between the two checksums a different function can also be used, which depends linearly on the checksums and on the two keys and returns a specified value, in particular a zero vector, if the two keys match.

From the above formula it can be derived that the difference $s_{err}$ of the two checksums $s_A$, $s_B$, in particular due to the linearity of the Galois field used with regard to its two operations, can also be represented as a product of the test matrix P with a vectorial correction value $k_{err}$. If the second terminal B now transfers the difference $s_{err}$ of the two checksums $s_A$, $s_B$ to a server C, which is different from the two terminals A, B and spatially separated from them, via the potentially insecure communication channel L, then this server can only calculate a correction vector $k_{err}$ with knowledge of the difference $s_{err}$ of the two checksums $s_A$, $s_B$, wherein if said factor is added to one of the two keys $k_A$, $k_B$ it yields the other key.

Alternatively, the possibility also exists that the two checksums $s_A$, $s_B$ are transferred to the server C independently of each other via the second communication channel L and this server C forms the difference between the checksums $s_A$, $s_B$. The formation of the difference between the two checksums $s_A$, $s_B$ can be carried out numerically with very little resources, so that it does not matter whether this operation is carried out by one of the terminals A, B or by the server C. The main task of the server C consists of forming a correction vector $k_{err}$ based on the difference $s_{err}$ of the two checksums $s_A$, $s_B$, for which the following applies:

$$S_{err} = k_{err} \cdot P$$

In simplified terms, a correction vector $k_{err}$ is sought, which when applied to the jointly agreed test matrix P, yields a checksum equal to the difference $s_{err}$ between the two test vectors $s_A$, $s_B$. Such a correct procedure is shown, for example, in Robert G. Gallager (1963). Low Density Parity Check Codes (PDF). Monograph, M.I.T. Press. Retrieved Aug. 7, 2013. Such a method can only be solved with great computational effort, even if the checksums used are as short as possible.

After implementation the correction value $k_{err}$ in accordance with the agreement is transferred to one or both of the terminals A, B. In the present case, the key $k_B$ of the second terminal B is adjusted by adding the correction vector $k_{err}$, in such a way that it matches the key $k_A$ of the first terminal. Alternatively, it would of course also be possible to add the correction value $k_{err}$ only to the key $k_A$ of the first terminal A, in order to obtain in the first terminal A a key $k_A'$, whose value matches the key of the second terminal B. Since random signals are usually selected for the generation of the signal anyway, it is not necessary to reconstruct exactly the value that was transmitted via the first communication channel Q.

After the keys $k_A$, $k_B$ in the terminals A, B have been brought into correspondence, in the following optional step, consideration must be given to the fact that any attackers, because of the transmitted checksum and the information that the attacker has acquired while eavesdropping, were able to access individual properties of the key $k_A$, $k_B$ used. If the number of bits of the individual keys $k_A$, $k_B$ is then reduced in a possibly known manner, at least agreed in advance between the terminals A, B, to a number of bits which is at least equal to the number of bits of the checksum $s_A$, $s_B$, then a potential attacker gains the least amount of information possible about the key $k_A$, $k_B$ from the transmitted checksums $s_A$, $s_B$.

With regard to the manner of the creation of the signal containing the key, there are several different possible variants. This signal can advantageously be a quantum signal, but also a different signal which is transferred via an error-prone first communication channel Q, specifically designed to be not ideally copiable by an attacker.

It is possible that in an otherwise identical approach, the second terminal B transmits a signal to the first terminal A via the communication channel Q, which is received by the latter. Again, in both terminals A, B, different keys $k_A$, $k_B$ are obtained.

In addition, it is also possible that the signal is transmitted as a quantum signal via the first communication channel Q, which in this case is implemented as a quantum communication channel, from a third location to the two terminals A, B. In this case, photons entangled with each other are typically transmitted via the first communication channel Q, so that signals corresponding to each other can be detected in each of the two terminals A, B.

It is also possible within the scope of the invention that both terminals A, B, each form a checksum separately and transmit them via the second potentially insecure communication channel L to the server C. In this alternative the server determines the difference between the checksums itself.

Later in the process, messages can be exchanged between the two terminals A, B which have been protected by means of a symmetric cryptography procedure, in each case using the key $k_A$, $k_B$ stored in the terminal A, B and brought into correspondence.

In particular, the possibility also exists to improve the authenticity of the messages by generating key-dependent hash values. In this case, messages are exchanged between the terminals A, B. A hash value is appended to each of the messages, which is derived in a predefined way from the key and from the information to be transmitted in the message. The message is then transferred via the second communication channel L. Upon reception the respective receiving terminal A, B checks whether the hash value transmitted is derived in the predefined way from the key and from the information to be transmitted in the message. If this is the case, the authenticity of the message is verified and the message is considered to be genuine.

The invention claimed is:

1. A method for creating and distributing cryptographic keys for securing communication on two terminals, which comprises the steps of:
   distributing signals for creating correlated values in the two terminals via a first error-prone communication channel and the correlated values exist as keys in the two terminals;
   forming a first checksum on a basis of a first key present in a first terminal and the first checksum is transferred to a second terminal via a second communication channel different from the first error-prone communication channel;
   forming a second checksum based on a second key present in the second terminal and the first and second checksums is transmitted to a server which is different from the first and second terminals and physically separated therefrom;

determining, via the server, and on a basis of the first and second checksums, a correction value, which when applied to one or both of the first and second keys brings the first and second keys into correspondence; and transmitting the correction value to one or both of the first and second terminals via the second communication channel and applied to one or both of the first and second keys.

2. The method according to claim 1, wherein the signals generating the correlated values in the first and second terminals are distributed, by:
  a random signal being created by the first terminal and being transmitted to the second terminal; or
  a random signal being created by the second terminal and being transmitted to the first terminal; or
  an entangled quantum state being generated by an external signal source and transmitted to both of the first and second terminals by means of quantum communication.

3. The method according to claim 1, wherein to form the correlated values, parts of a transmitted signal are selected and remaining parts of the transmitted signal are discarded.

4. The method according to claim 1, wherein:
  a key is specified as a binary vector of a given length;
  a publicly known test matrix containing binary numbers as entries is defined, a number of rows of which corresponds to a given length of the keys and a number of columns of which corresponds to a length of the first and second checksums; and
  the first and second checksums are formed by forming a matrix-vector multiplication, in which an XOR operation is used as addition of bits and an AND operation as multiplication of bits.

5. The method according to claim 1, wherein:
  a key is specified as a vector of a given length, elements of which originate from a Galois field;
  a publicly known test matrix is defined, containing elements of a Galois field as entries, a number of lines of which corresponds to a length of the first and second keys and a number of columns of which corresponds to a length of the first and second checksums; and
  the first and second checksums are formed by forming a matrix-vector multiplication, wherein relevant operations of an element from the Galois field are used as addition and multiplication.

6. The method according to claim 1, which further comprises reducing a length of the first and second keys in a predefined way by a number of bits that is at least equal to a number of bits of a checksum.

7. The method according to claim 1, which further comprises exchanging between the first and second terminals messages, which have been protected by means of a symmetric cryptography procedure in each case using a key stored in the terminals.

8. The method according to claim 1, which further comprises exchanging between the first and second terminals messages, wherein a hash value is appended to each of the messages, which is derived in a predefined way from a key and from information to be transmitted in a message, wherein upon reception a receiving terminal checks whether the hash value transmitted is derived in a predefined way from the key and from the information to be transmitted in the message, and if this is valid an authenticity of the message is verified.

9. The method according to claim 1, wherein the first error-prone communication channel is a quantum communication channel.

10. The method according to claim 2, wherein:
  the random signal is transmitted to the second terminal by means of quantum communication; and
  the random signal is transmitted to the first terminal by means of quantum communication.

11. A method for creating and distributing cryptographic keys for securing communication on two terminals, which comprises the steps of:
  distributing signals for creating correlated values in the two terminals via a first error-prone communication channel and the correlated values exist as keys in the two terminals;
  forming a first checksum on a basis of a first key present in a first terminal and the first checksum is transferred to a second terminal via a second communication channel different from the first error-prone communication channel;
  forming a second checksum based on a second key present in the second terminal and a difference of the first and second checksums is transmitted to a server which is different from the first and second terminals and physically separated therefrom;
  determining, via the server, and on a basis of the difference of the first and second checksums, a correction value, which when applied to one or both of the first and second keys brings the first and second keys into correspondence; and
  transmitting the correction value to one or both of the first and second terminals via the second communication channel and applied to one or both of the first and second keys.

12. A method for creating and distributing cryptographic keys for securing communication on two terminals, which comprises the steps of:
  distributing signals for creating correlated values in the two terminals via a first error-prone communication channel and the correlated values exist as keys in the two terminals;
  forming a first checksum on a basis of a first key present in a first terminal and the first checksum is transferred to a second terminal via a second communication channel different from the first error-prone communication channel;
  forming a second checksum based on a second key present in the second terminal and information derived from the first and second checksums about the second communication channel, is transmitted to a server which is different from the first and second terminals and physically separated therefrom;
  determining, via the server, and on a basis of the information derived from the first and second checksums, a correction value, which when applied to one or both of the first and second keys brings the first and second keys into correspondence; and
  transmitting the correction value to one or both of the first and second terminals via the second communication channel and applied to one or both of the first and second keys.

* * * * *